No. 705,417. Patented July 22, 1902.
W. R. MAY.
GOVERNOR FOR PROPELLER SHAFTS.
(Application filed Oct. 7, 1901.)
(No Model.) 6 Sheets—Sheet 1.
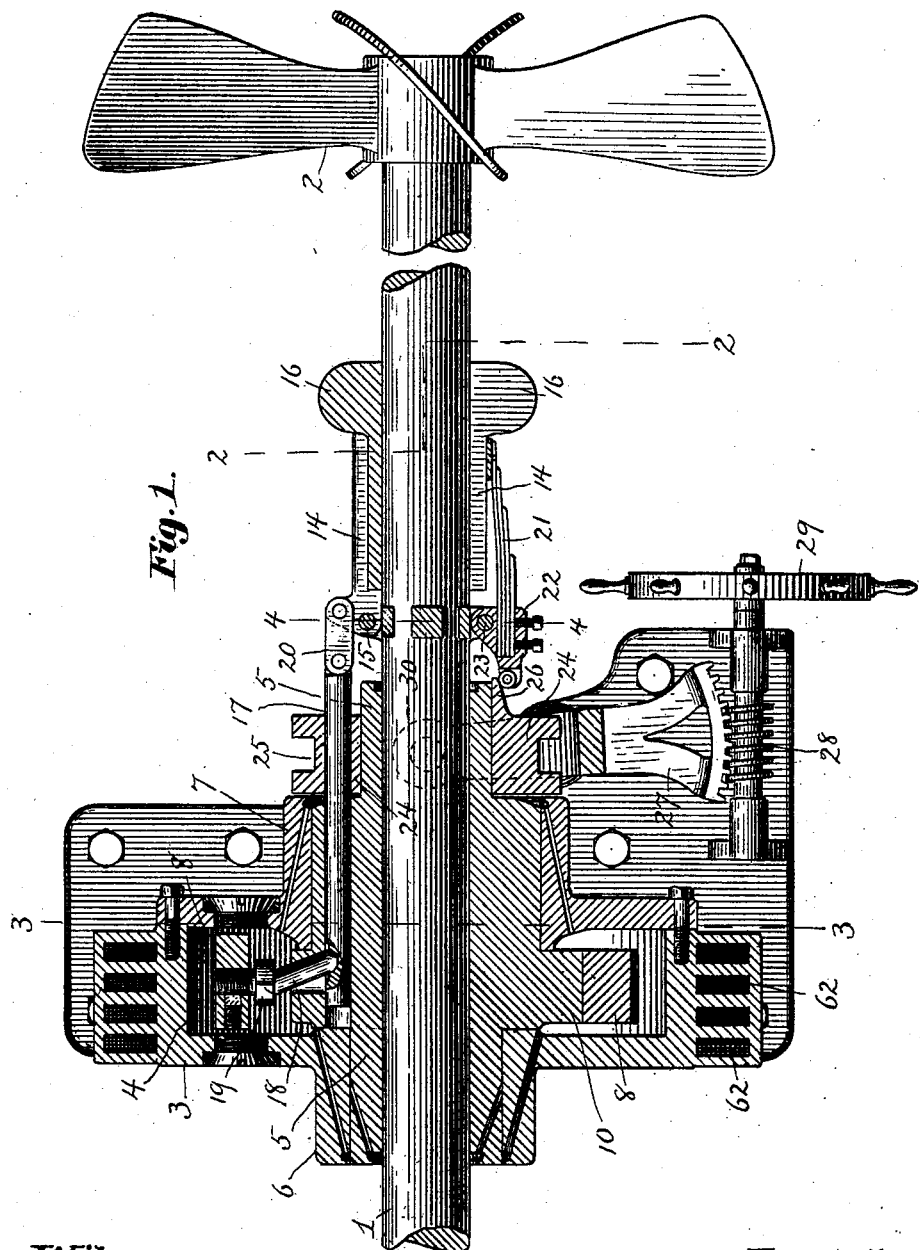
Witnesses:
Walter E Lombard.
P. W. Pezzetti
Inventor,
William R. May,
by Wright Brown & Quinby
Attys.

No. 705,417. Patented July 22, 1902.
W. R. MAY.
GOVERNOR FOR PROPELLER SHAFTS.
(Application filed Oct. 7, 1901.)

(No Model.) 6 Sheets—Sheet 2.

Witnesses:
Walter E Lombard
P. W. Pezzetti

Inventor:
William R. May,
by Might Brown & Quinby
Attys.

No. 705,417. Patented July 22, 1902.
W. R. MAY.
GOVERNOR FOR PROPELLER SHAFTS.
(Application filed Oct. 7, 1901.)
(No Model.) 6 Sheets—Sheet 3.

Witnesses:
Walter E. Lombard
P. W. Pezzetti

Inventor:
William R. May,
by Wright Brown & Quinby
Attys.

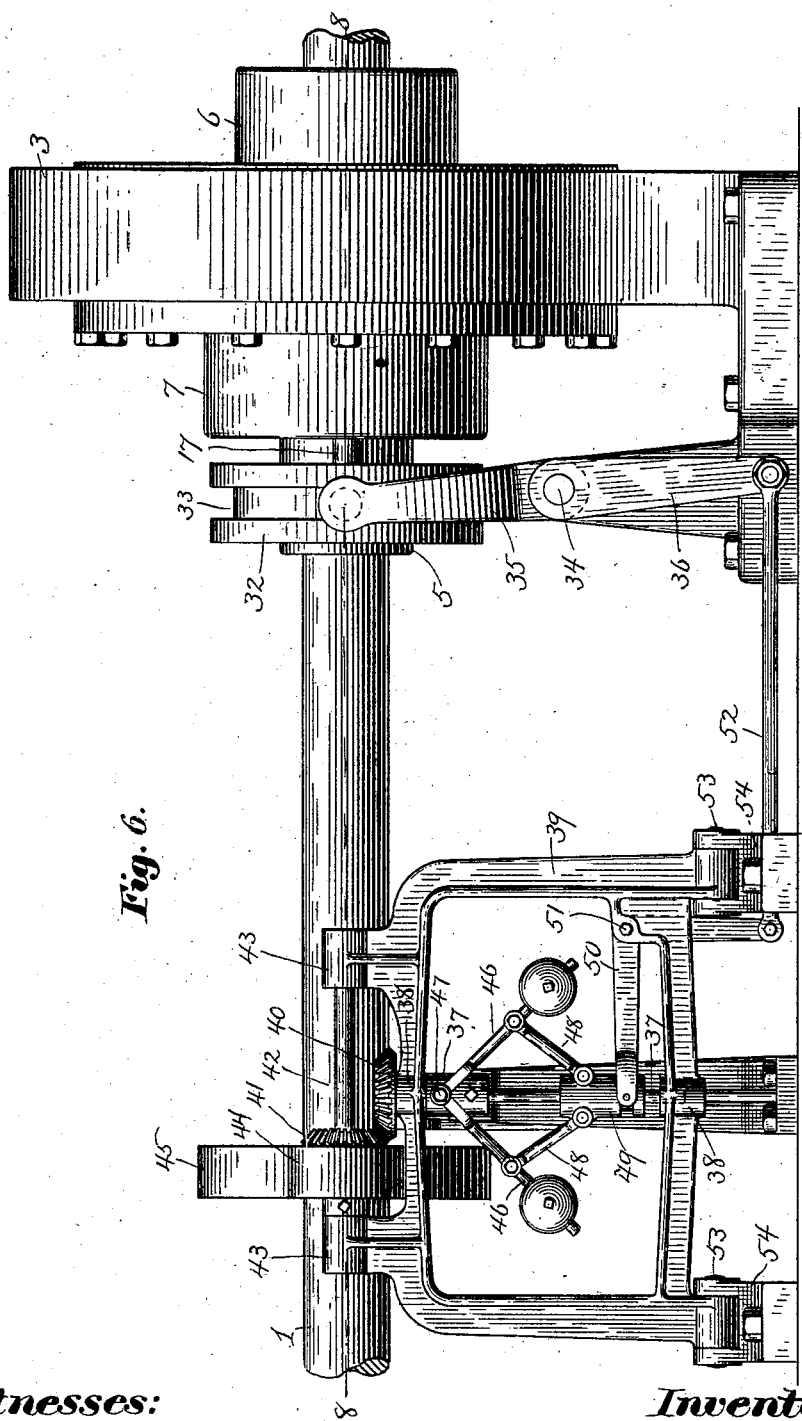

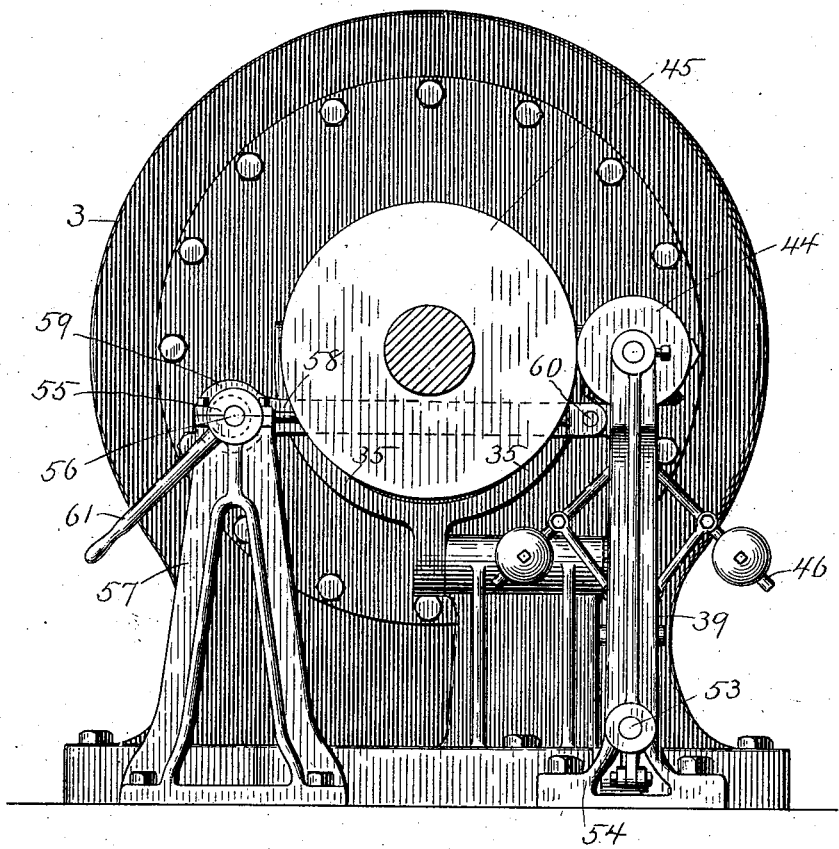

No. 705,417. Patented July 22, 1902.
W. R. MAY.
GOVERNOR FOR PROPELLER SHAFTS.
(Application filed Oct. 7, 1901.)
(No Model.) 6 Sheets—Sheet 6.

Witnesses:
Walter E. Lombard.
P. W. Pezzetti.

Inventor:
William R. May,
by Wright Brown & Quinby
Attys.

UNITED STATES PATENT OFFICE.

WILLIAM R. MAY, OF NEWTON, MASSACHUSETTS.

GOVERNOR FOR PROPELLER-SHAFTS.

SPECIFICATION forming part of Letters Patent No. 705,417, dated July 22, 1902.

Application filed October 7, 1901. Serial No. 77,765. (No model.)

*To all whom it may concern:*

Be it known that I, WILLIAM R. MAY, of Newton, in the county of Middlesex and State of Massachusetts, have invented certain new and useful Improvements in Governors for Propeller-Shafts, of which the following is a specification.

This invention has for its object to provide an automatic braking or retarding mechanism for retarding the rotation of a propeller-shaft when the rotation becomes excessively rapid, as when the propeller is raised from the water by the movement of the vessel.

The invention consists in the combination, with a propeller-shaft, of a brake comprising a friction-clutch, one member of which is fixed and surrounds the shaft, while the other member is engaged with the shaft and rotates with it, one member being adapted to frictionally engage the other, and centrifugal connections between the propeller-shaft and the movable clutch member, whereby when the speed of the shaft exceeds a predetermined rate or degree the clutch members are engaged and retard the rotation of the shaft.

The invention also consists in certain subordinate combinations, all of which I will now proceed to describe and claim.

Figure 4:
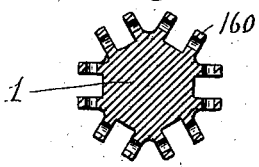
Figure 2:
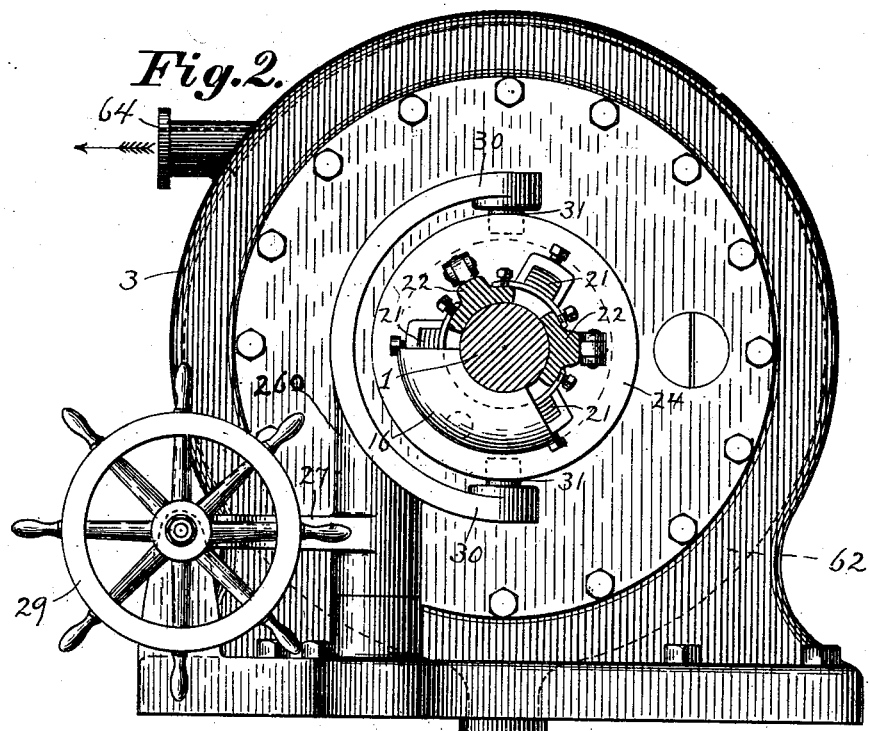
Figure 5:
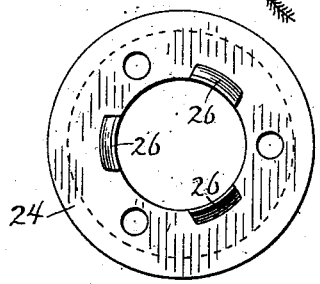
Figure 3:
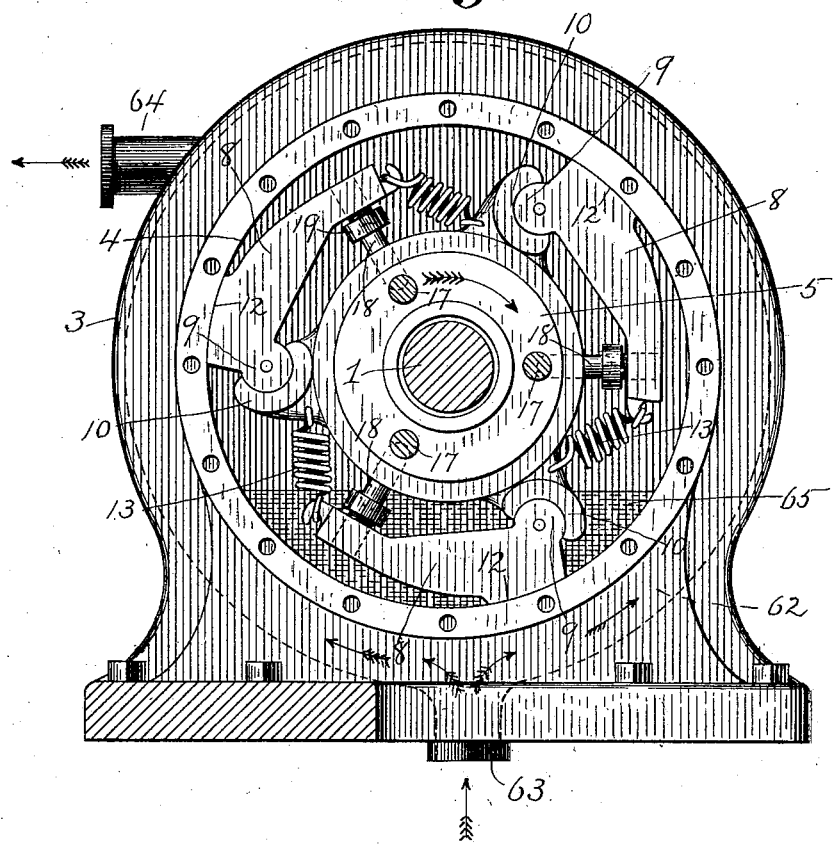
Figure 8:
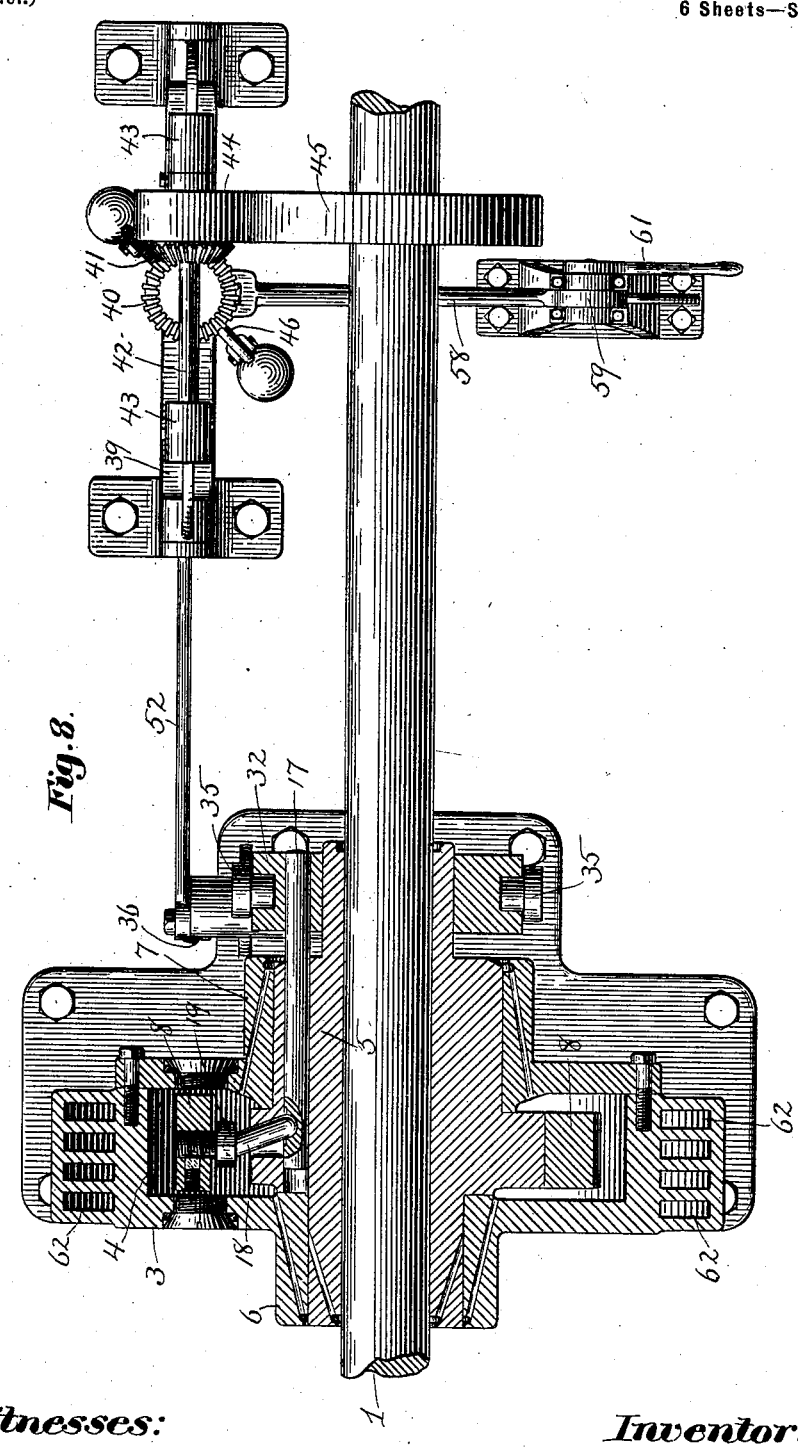

Of the accompanying drawings, forming a part of this specification, Figure 1 represents a top plan view of a propeller-shaft and a view, partly in plan and partly in section, of a speed-governing mechanism for said shaft embodying my invention. Fig. 2 represents a section on line 2 2 of Fig. 1 and an elevation of the parts at the left of said line. Fig. 3 represents a section on line 3 3 of Fig. 1 and an elevation of the parts at the left of said line. Fig. 4 represents a section on line 4 4 of Fig. 1, certain parts intersected by said line being omitted. Fig. 5 represents a side view of one of the parts shown in Figs. 1 and 2. Figs. 6 and 7 represent, respectively, a side and an end elevation showing a different and the preferred embodiment of my invention. Fig. 8 represents a section on line 8 8 of Fig. 6 and a plan view of the parts below said line.

The same letters of reference indicate the same parts in all of the figures.

In the drawings, 1 represents a propeller-shaft, and 2 the propeller affixed thereto.

3 represents a fixed casing, which is chambered to form an internal friction-face 4, which is concentric with the shaft 1 and is separated therefrom by an annular space of sufficient size to receive the clutch parts, hereinafter described. The casing 3, with its internal friction-face, constitutes the outer member of a friction-clutch. The inner member of said clutch comprises a sleeve 5, which is affixed to the shaft 1 and is fitted to rotate in bearings 6 7, formed on the casing 3, and levers 8, fulcrumed at 9 on ears 10, formed on or affixed to the sleeve 5. The levers 8 are adapted to swing toward and from the internal face 4 and have short friction-faces 12 at their inner ends, which are caused to engage the internal face 4 by the outward movement of the levers. When the friction-faces of the levers are pressed against the internal friction-face of the fixed casing, they act to retard the rotation of the shaft. The levers 8 are normally held with their friction-faces out of contact with the internal friction-face of the casing by springs 13, connecting the outer ends of the levers with the sleeve 5, and centrifugally-operated mechanism is provided whereby when the speed of the shaft exceeds a predetermined rate or degree the levers are forced outwardly to cause the engagement of the friction-faces. I have shown two forms of centrifugally-controlled mechanism for this purpose and will first describe the organization shown in Figs. 1 and 2.

14 14 represent centrifugally-formed members, formed as levers fulcrumed at 15 to ears 16, Fig. 4, formed on the shaft 1, said levers having weights 16 at their outer ends.

17 17 represent slides which are fitted to move in guides in the sleeve 5 and have seats or steps on which are seated the inner ends of the struts 18, the outer ends of which bear upon the socketed heads of screws 19, affixed to the levers 8. The slides 17 are connected by links 20 with the levers 14. Springs 21, affixed to the rocking holders 22, pivoted at 23 to the ears 16, are arranged to press against the levers 14 and hold said levers normally against the periphery of the shaft 1, as shown in Fig. 1. When the levers 14 are in the position last described, the slides 17 are retracted and hold the struts 18 in the inclined positions shown in Fig. 1, so that the said struts do not exert outward pressure on the levers 8. The rotation of the shaft gives the levers 14 a tendency to swing outwardly by centrifugal force when the rotation becomes sufficiently rapid to overcome the force of the springs 21. When the levers 14 are thus swung outwardly, the slides 17 are moved forward, causing the struts 18 to press outwardly on the levers 8, and thus force the friction-faces 12 of said levers into engagement with the internal friction-face 4 and retarding the rotation of the shaft.

Means are provided for varying the force of the springs 21, and thus making the above-described centrifugal governing mechanism more or less sensitive, said means comprising a collar 24, (see Fig. 5,) fitted to slide on the bearing 7 and having a groove 25 in its periphery and a series of wedge-shaped projections 26, the inclined outer sides of which bear upon rollers mounted on the spring-holders 22.

260 represents a tubular rock-shaft adapted to oscillate on a vertical stud (not shown) affixed to the supporting-base of the casing 3. Said rock-shaft has an arm 27, the outer end of which is formed with a worm-gear segment engaging a worm 28 on a shaft journaled in bearings on said supporting-base, said shaft being rotatable by a hand-wheel 29. The rock-shaft 260 is provided with two arms 30 30, constituting a fork and having studs 31, which enter the groove 25 in the collar 24. It will be seen that the rotation of the wheel 29 causes the wedge-shaped projections 26 to move longitudinally of the shaft, and thus vary the tension of the springs 21 in a manner which will be clearly understood by reference to Fig. 1.

In Figs. 6, 7, and 8 I show another and my preferred form of centrifugal governing mechanism. In the embodiment of my invention shown in the last-named figures the slides 17 are affixed at their outer ends to a collar 32, which is fitted to slide on the sleeve 5 and has a groove 33 in its periphery. 34 is a rock-shaft journaled in a fixed bearing on the supporting-base and having at one end a fork composed of arms 35 35, which are provided with studs entering the groove 33. The rock-shaft 34 is also provided with a downwardly-projecting arm 36. 37 represents a vertical governor-shaft which is journaled in bearings 38, formed on a frame 39. To the upper end of the shaft 37 is affixed a beveled gear 40, meshing with a similar gear 41, affixed to a shaft 42, journaled in bearings 43 on the frame 39. 44 45 represent friction-wheels affixed, respectively, to the shaft 42 and to a propeller-shaft, each of said wheels 44 and 45 being held in frictional engagement with each other, as hereinafter described. 46 46 represent centrifugally-controlled members formed as weighted governor-arms pivoted at 47 to the enlarged upper portion of the shaft 37. Said arms are connected by links 48 with a collar 49, fitted to slide on the reduced lower portion of the shaft 37. 50 represents a bell-crank lever fulcrumed at 51 to the frame 39, one arm of said lever being forked and engaged with a groove in the collar 49, while the other arm is connected by a rod 52 with the arm 36 on the rock-shaft 34.

It will be seen that rotation is imparted from the propeller-shaft through the friction-wheels 44 45 and gears 41 and 40 to the governor-shaft 37 and that when the rotation of said governor-shaft is sufficiently rapid to cause the arms 46 to be swung upwardly by centrifugal force motion is communicated from said arms through the described connections to the slides 17, which are thus caused to move the struts 18 in the direction required to press the friction-faces of the levers 8 against the fixed internal friction-face 4, the result being the same as that of the centrifugal mechanism shown in Figs. 1 and 2.

I have provided means for making the centrifugal governing mechanism shown in Figs. 6, 7, and 8 inoperative, or, in other words, preventing centrifugal movement of said centrifugally-controlled members. To this end frame 39 is pivoted at 53 to fixed supports or brackets 54, the arrangement being such that the frame 39 can be swung toward and from the propeller-shaft, movement of the frame away from the propeller-shaft separating the friction-wheel 44 from the friction-wheel 45 and making the described centrifugal mechanism inoperative. These movements of the frame 39 are effected by means of the eccentric 55, (shown in dotted lines in Fig. 7,) said eccentric being affixed to the rock-shaft 56, journaled in bearings in a fixed supporting-frame 57, and a rod or link 58, having at one end an eccentric-strap 59, embracing the eccentric 55, and pivoted at the other end at 60 to an ear on the frame 39. The eccentric 55 may be turned by means of a handle 61, affixed to the rock-shaft 56, and when so turned moves the frame 39 toward or from the propeller-shaft.

To prevent excessive heating of the friction-faces when they are engaged to retard the rotation of the propeller-shaft, I provide a liquid-conduit or series of conduits 62, (shown in section in Fig. 1 and in dotted lines in Figs. 2 and 3,) said conduits being formed between the friction-face 4 and the outer surface of the casing 3, so that their inner walls are in close proximity to the friction-face 4. Liquid is admitted to the conduits 62 through an inlet 63, which may communicate with the water in which the vessel floats or with a suitable pump.

64 represents an outlet for a cooling liquid, which outlet is preferably at a higher point than the inlet 63 and may be extended to conduct the water out of the vessel.

65 represents a body of oil contained in the annular space between the friction-face 4 and the sleeve 5, said oil lubricating the friction-faces and preventing excessive wear of the same.

The particular form of clutch mechanism here shown and described is not of my invention, the same being shown and claimed in an application of Carl M. Wheaton for Letters Patent of the United States in improvement in friction-clutches, filed August 17, 1901, Serial No. 72,358.

Having thus explained the nature of my invention and described a way of constructing and using the same, although without attempting to set forth all of the forms in which it may be made or all of the modes of its use, I declare that what I claim is—

1. The combination with a propeller-shaft, of a friction-clutch adapted to resist the rotation of the shaft and comprising a fixed member having an internal friction-face surrounding the shaft, and a movable member connected with the shaft and surrounded by the fixed member, and clutch-operating mechanism actuated by the rotation of the shaft.

2. The combination with a propeller-shaft, of a fixed friction-clutch member having an internal friction-face surrounding the shaft, a movable clutch member connected with the shaft, and comprising oscillatory levers having friction-faces, and centrifugal connections between the said shaft and levers.

3. The combination with a propeller-shaft, of a fixed casing surrounding the shaft and having an internal friction-face substantially concentric with the shaft, and a liquid-circulating conduit adjacent to said internal face, said conduit having an inlet and an outlet, a movable clutch member within the casing adapted to frictionally engage said internal face, and centrifugal connections between the shaft and the movable clutch member.

4. The combination with a propeller-shaft, of a friction-clutch adapted to resist the rotation of the shaft, connections between the shaft and the clutch mechanism comprising centrifugally-controlled members, and means for preventing centrifugal movement of said members whereby said connections may be made inoperative.

5. The combination with a propeller-shaft, of a friction-clutch comprising a fixed outer member and an inner member which is movable with the shaft, a governor-shaft geared to the propeller-shaft, centrifugal governor-arms pivoted to said shaft, and connections between said arms and the inner clutch member.

6. The combination with a propeller-shaft, of a friction-clutch comprising a fixed outer member and an inner member which is movable with the shaft, a governor-shaft adjacent to the propeller-shaft, a movable yoke or frame supporting the governor-shaft, gearing connecting the governor-shaft with the propeller-shaft, said gearing including two friction members, one mounted on the propeller-shaft and the other on the movable frame, said members being separable by a movement of the frame, means for moving the frame, centrifugal governor-arms pivoted to the governor-shaft, and connections between said arms and the inner clutch member.

In testimony whereof I have affixed my signature in presence of two witnesses.

WILLIAM R. MAY.

Witnesses:
C. F. BROWN,
A. D. HARRISON.